Feb. 3, 1970 — F. CHAMPIGNY — 3,493,021
COMPOSITE WOODEN ARTICLES MADE FROM GRAINWOOD STICKS
AND METHOD AND MACHINE FOR MAKING THEM
Filed Dec. 26, 1967 — 3 Sheets-Sheet 2
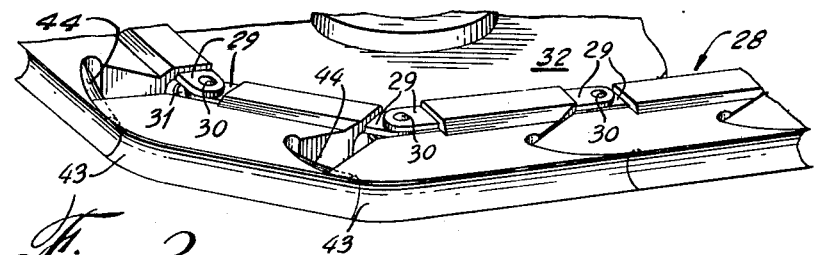
Fig. 2
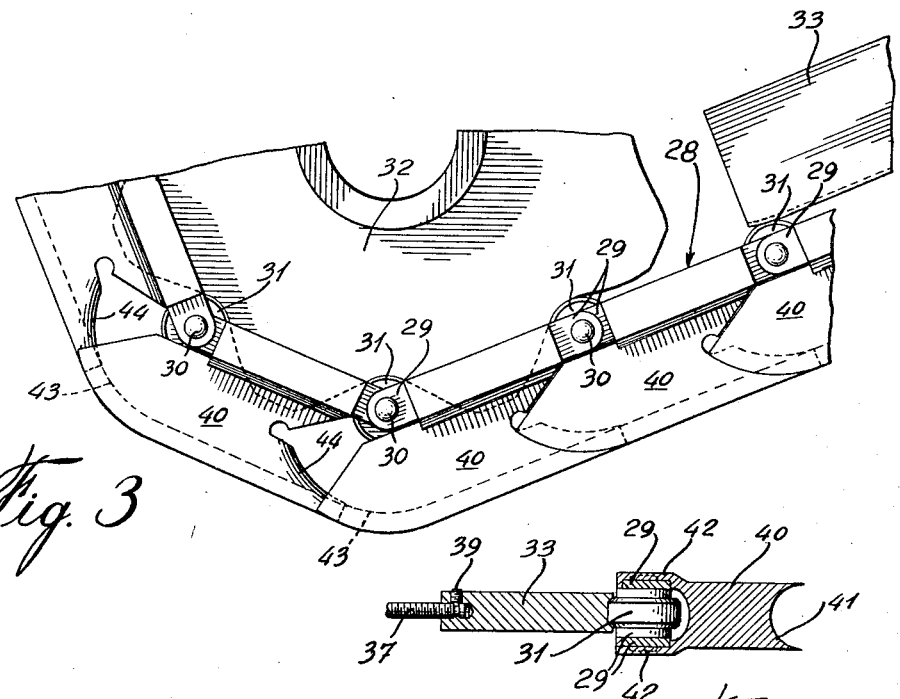
Fig. 3
Fig. 4
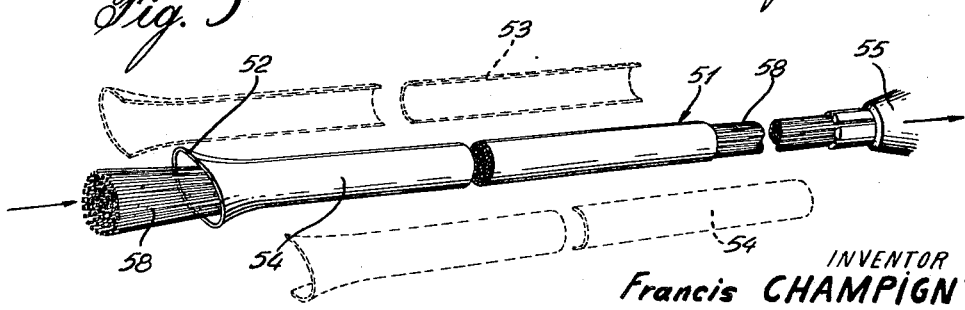
Fig. 5
INVENTOR
Francis CHAMPIGNY
BY
Raymond A. Robic
ATTORNEY Feb. 3, 1970 F. CHAMPIGNY 3,493,021
COMPOSITE WOODEN ARTICLES MADE FROM GRAINWOOD STICKS
AND METHOD AND MACHINE FOR MAKING THEM
Filed Dec. 26, 1967 3 Sheets-Sheet 3
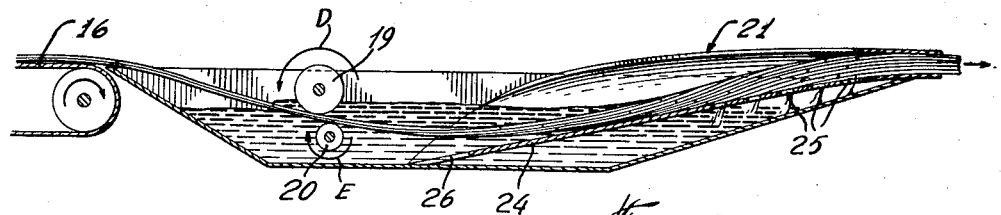
Fig. 6
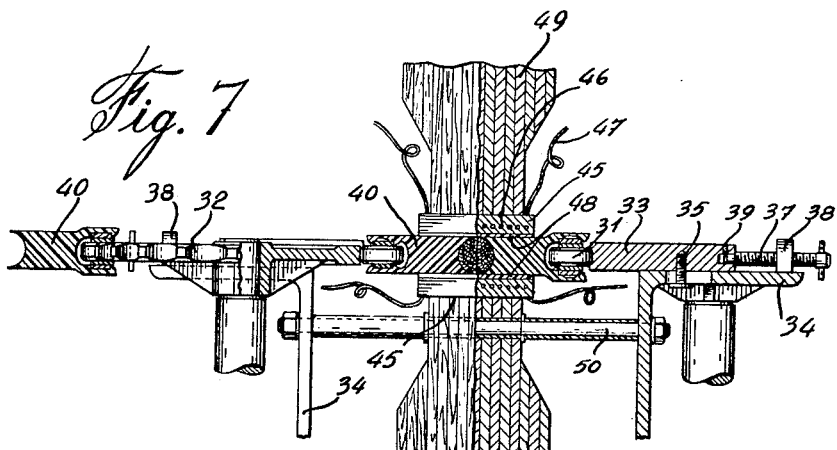
Fig. 7
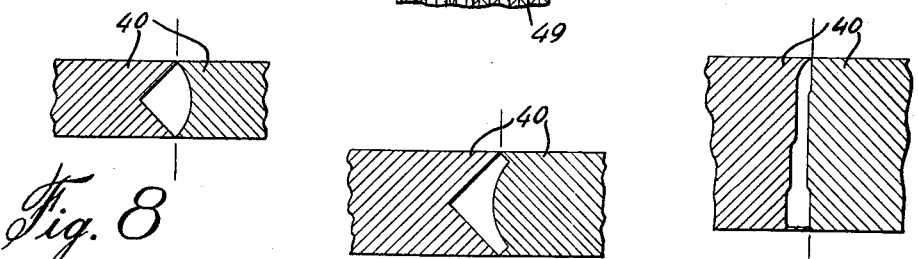
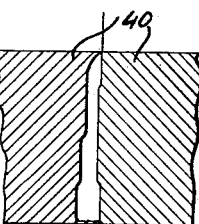
Fig. 8
Fig. 9
Fig. 10
Fig. 11
Fig. 12
Fig. 13
INVENTOR
Francis CHAMPIGNY
BY
Raymond A. Robic
ATTORNEY

United States Patent Office 3,493,021
Patented Feb. 3, 1970

3,493,021
COMPOSITE WOODEN ARTICLES MADE FROM GRAINWOOD STICKS AND METHOD AND MACHINE FOR MAKING THEM
Francis Champigny, Jovite, Quebec, Canada, assignor to Harwood Dimensions (Canada) Ltd., Montreal, Quebec, Canada
Filed Dec. 26, 1967, Ser. No. 693,646
Int. Cl. B29j 5/10
U.S. Cl. 144—317          11 Claims

ABSTRACT OF THE DISCLOSURE

The invention consists of a composite wooden article made by shaping a bundle of sticks of small dimension obtained by cutting along the wood grain and impregnated with glue into a desired shape and then curing the glue.

---

Figure 1:
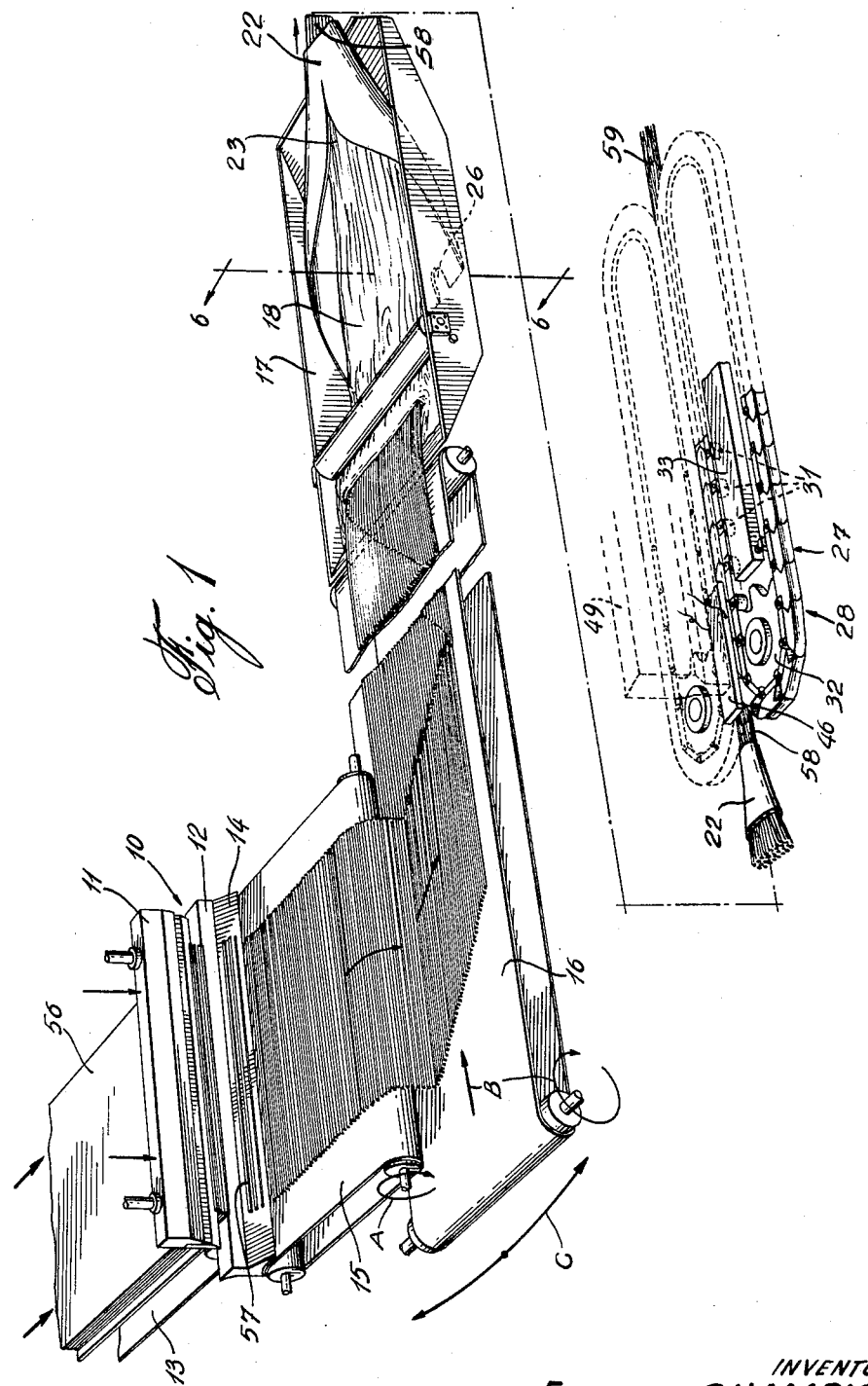

The present invention relates to shaped elongated wooden articles such as dowels or mouldings.

The invention particularly concerns a method of making such wooden articles and a machine for carrying out the method and includes as well the resulting articles themselves.

The conventional method of making shaped wood articles consists of passing boards through a shaper which comprises as its essential element a suitably formed cutter.

It is well known that this method involves a substantial waste of wood amounting sometimes to 80% or more of the volume of the board.

It is the main object of the present invention to provide a method and machine by means of which shaped elongated wooden articles may be manufactured with practically no waste of wood at all.

A further object of the invention is to enable the manufacture of such articles in a continuous manner so that the required lengths can be cut off from the continuously shaped article thereby further reducing the waste involved in cutting off short ends in the conventional production method.

The articles produced according to the invention are about as strong and can be worked with about the same ease as articles of the same quality of wood produced by conventional methods.

The invention furthermore avoids the cumbersome necessity of selecting for such wooden articles lengths of wood which are free of knots.

According to the method of the invention, the wood is cut into discrete sticks of small dimension, obtained by cutting along the grain of the wood, the stocks are coated with glue and they are gathered and shaped into the desired shape while curing the glue.

Preferred embodiments of the invention are illustrated by way of example in the accompanying drawings in which:

FIGURE 1 is a schematic perspective view of a machine for making shaped wooden articles;
FIGURE 2 is a fragmentary perspective view of a shaper which is part of the machine shown in FIGURE 1;
FIGURE 3 is a fragmentary plan of the shaper;
FIGURE 4 is a detail of the shaper in section along line 4—4 of FIGURE 3;
FIGURE 5 is a perspective view of a modified embodiment of the shaper;
FIGURE 6 is a longitudinal section of a glue bath which is part of the machine shown in FIGURE 1;
FIGURE 7 is a cross-section of the shaper shown in FIGURES 1 to 4;
FIGURES 8, 9 and 10 are fragmentary schematical cross-sections of modified shaper elements; and
FIGURES 11, 12 and 13 are cross-sections of wooden articles produced by the shaper element shown in FIGURES 8, 9 and 10, respectively.

Referring to FIGURE 1, the machine comprises a shear 10 including a reciprocating knife 11 and a backing member 12. A table 13 is mounted behind the backing member 12. On the feed side of the shear 10, the backing member has a depending inclined slide 14.

Below the slide 14 is mounted a conveyor belt 15 moving in a direction transverse to the knife 11 and away from the shear 10 as indicated by arrow A.

A second conveyor belt 16 is disposed under the feed end of conveyor belt 15. Conveyor belt 16 runs in a direction parallel to the knife 11 as indicated by arrow B. The conveyor belt 16 is mounted on a framework (not shown) in such a manner that its receiving end can move back and forth under the feed end of conveyor belt 15 as indicated by arrow C. The feed end of conveyor 16, which is stationary, feeds into a trough 17 containing a bath of glue 18.

Near the entrance of the trough 17 are mounted a pair of oppositely rotating rollers 19 and 20 (FIG. 6) disposed one above the other, the top roller 19 being of a greater diameter than the bottom roller 20 and being located at the surface of bath 18 while the roller 20 is immersed in the bath 18. As indicated by the arrows D and E in FIGURE 6, both rollers 19 and 20 rotate towards the slot which is formed therebetween, from the inlet side of the trough 17.

The trough 17 also contains a funnel 21 having its wide inlet dipping into the bath 18 and its narrow outlet 22 projecting from the bath on the outlet side opposite the conveyor 16.

The top face of the funnel 21 is cut in to provide a scoop-like shape as indicated at 23. The portion of the bottom face 24 of the funnel 21 which is above the surface of the bath 18 has a plurality of holes 25. The bottom edge of the lower face 24 of the funnel 21 has a plurality of cut-outs 26 which provide communication between the portions of bath 18 on either side of the funnel 21.

A shaper 27 is provided at the outlet 22 of the funnel 21. The shaper 27 comprises a pair of chains 28 formed of links 29 connected by link pins 30 on which are mounted rollers 31, as best seen in FIGURES 3 and 4.

The chains 28 are mounted in horizontal position on sprocket wheels 32 at either end of each chain, secured to vertical shafts.

The chains 28 are driven by the sprocket 32 in such a way that the adjacent inner courses of the chains 28 travel in a direction away from the funnel end 22.

The inner courses of the chains 28 are supported between the sprockets 32 by rails 33 on either side, secured to framework angle members 34 by screws 35 mounted within slots 36 of the framework members 34.

The rails 33 are suitable grooved on internal side to provide run-ways for the rollers 31 of the chains 28. At the opposite, external side the rails 33 are engaged by adjustment bolts 37 threaded through nuts 38 secured to the framework members 34. The adjustment bolts 37 enter holes of the rails 33 and are held therein by set screws 39.

Shaper elements 40 are secured to the links 29 of the chains 28. Each shaper element has an outer shaping surface 41 which may have a variety of shapes as shown in FIGURES 4, 8, 9 and 10 to provide variously shaped articles.

At the inner end, each shaper element 40 has projecting flanges 42 the internal surfaces of which fit the chain links 29.

The leading end of each shaper element 40 has a convex contour 43 concentric with the axis of the corresponding link pin 30 while the trailing end of each shaper ement 40 has a corresponding concave internal contour
also concentric with the axis of the corresponding pin
), such that when the chain winds around the sprocket
2, the convex and concave contours 43 and 44 slide over
ich other and provide a continuous shaping surface
rmed by consecutive surfaces 41 as shown in FIGURE
. Along the straight stretch of chain 28, the convex contour 43 again slides over and into the concave contour 44.

The shaper elements 40 may be made of metal as indicated in FIGURES 4, 8, 9 and 10 or they may be made of an inert heat-resistant plastic to which glue does not adhere such as, for example, polytetrafluoroethylene known under the trade mark "Teflon."

As shown in FIGURES 1 and 7, the opposite shaper elements 40 of the two chains are firmly held together during their movement along their internal courses of the chains 28 by top and bottom plates 45 of refractory material containing a plurality of longitudinally disposed electrical resistance wires 46 constituting a heating element, connected by conductors 47 to a power source (not shown).

The internal faces of plates 45 which are in contact with the shaper element 40 are lined with a low friction heat-resistant material such as Teflon as indicated at 48. Externally, the plates 45 are backed by beams 49, for example of laminated wood, which are securely held in place on the machine framework, most of which is not shown.

A connection of the lower beam 29 to the frame members 34 is shown in FIGURE 7 as consisting of transverse bolt 50.

A modified shaper 51 of simplified construction is illustrated in FIGURE 5. The shaper 51 consists of a tube with a flaring inlet 52, the tube being formed of two separable halves 53 and 54. At the outlet of the tube, there is provided a puller 55, for example, in the shape of a chuck.

The illustrated tube 51 is of circular cross-section but other different cross-sections may be used.

The preferred method of manufacturing the shaped wooden articles will now be described in connection with the above described machine.

With reference to FIGURE 1, a stack of wood veneers 56 is placed on table 13 and is fed to the shear 10. A suitable advancing mechanism (not shown) for the veneers 56 is provided such that the knife 11, which moves up and down, cuts the veneers 56 into sticks 57 of small dimension. The width of the sticks 57 is substantially the same as the thickness of the veneer 56 so that the sticks 57 are approximately square in cross-section. The veneers 56 are fed to the knife with the grain of the wood parallel to the knife so that the sticks 57 are along the direction of the grain.

The sticks 57 cut by the knife 11 fall along the slide 14 onto the conveyor belt 15 and are fed by the conveyor belt 15 onto the conveyor belt 16. The speed of the conveyor belt 15 is such that the sticks 57 form thereon substantially a single layer.

The conveyor belt 16 picks up the sticks 57 and due to its back and forth movement along arrow C, there are formed thereon superposed layers of sticks with their ends off-set longitudinally alternately in opposite directions as illustrated in FIGURE 1. As a result, any weakening effect due to the termination of the individual sticks 57 is evenly distributed over the length of the article.

The superposed layers of sticks 57 are fed from the conveyor 16 into the bath 18 being forcibly conveyed thereinto by the rollers 19 and 20. The sticks 57 proceed through the bath 18 and become coated and partly impregnated with glue. They are then collected by the funnel 23 and pushed out as a bundle 58 continuously through the outlet 22 of the funnel. The narrowing of the funnel 21 has the effect of squeezing excess glue from the sticks 57. The excess glue passes through holes 25 and slots 26 and is returned into the bath 18.

The bundle of sticks 58 extruded from the outlet 22 is then picked up by the shaper 27. The surfaces 41 of the shaping elements 40 compress the bundle 58 together and shape it into the desired shape while, simultaneously, the heating elements 46 cure and dry the glue so that at the outlet of the shaper 27, a dry finished article 59 is continuously supplied which may then be cut to the required length by a saw (not shown) travelling the article at the same speed as the article 59 and cutting across it at predetermined intervals.

The shaped article 59 may, of course, be subjected to finishing operations such as sanding and painting before or after it is cut.

The operation of the modified shaper 51 is essentially the same as that of the shaping elements 40 but since the shaper 51 is a mere tube, it does not possess a conveying action and a puller 55 must therefore be provided. The puller 55 will pull out the required length of the article 59 which will then be cut and the puller 55 will then again be connected to the cut end to pull out another length. The flanged end 52 of the shaper tube 51 has the effect of compressing the bundle of sticks 58 as in the case of shaper 27.

The tube 51 may be separated into its halves 53 and 54 for starting the continuous operation or for cleaning purposes when required. Heater elements (not shown) are also provided for the shaper 51.

The shaper elements 40 (or the tube 51) may be provided with shaping surfaces 41 adapted to produce any desired kind of cross-section. For example, in FIGURES 4, 5 and 7, the cross-section of the article 59 is circular. In FIGURE 8 and corresponding FIGURE 11, the article 60 is a convex corner moulding.

In FIGURE 12, the article 61 is a concave corner moulding while in FIGURES 10 and 13, the article 62 is a flat stepped moulding such as is used for baseboards and door and window frames.

I claim:

1. A method of making shaped elongated composite wooden articles which comprises cutting wood into a veneer, cutting said veneer along the grain into discrete sticks of substantially the same width as the thickness of the veneer, continuously feeding said stick to a bath of glue, continuously gathering a bundle of said sticks from said bath into a shaper, compressing said bundle in said shaper to the desired shape, and curing the glue while the bundle of sticks is passing through said shaper.

2. A method of making shaped elongated composite wooden articles which comprises cutting wood into a veneer, cutting said veneer along the grain into discrete sticks of substantially the same width as the thickness of the veneer, continuously feeding said sticks from the cutting station in directions simultaneously parallel and transverse thereto to provide layers of sticks with their ends longitudinally offset, continuously feeding said layers to a bath of glue, continuously gathering a bundle of said sticks from said bath into a shaper, compressing said bundle in said shaper to the desired shape, and curing the glue while the bundle of sticks is passing through said shaper.

3. A machine for making shaped elongated composite wooden articles comprising a reciprocating shear, a conveyor on the feed side of said shear feeding in a direction parallel to said shear, a glue bath at the feed end of said conveyor, a funnel in said bath having a narrow outlet projecting from the bath on the side opposite said conveyor, a shaper at the outlet of said funnel and a dryer operatively connected to said shaper.

4. A machine according to claim 3, wherein said conveyor is mounted for reciprocating movement transverse to said shear.

5. A machine according to claim 3, wherein said shaper comprises a pair of juxtaposed chains carrying opposite cooperating shaper elements.

6. A machine according to claim 5, with a slideway enclosing said shaper element, said dryer being disposed adjacent said slideway.

7. A machine according to claim 6, wherein said slideway is of low friction, heat-resistant plastic and said dryer comprises electric heating elements on either side of said slideway.

8. A machine according to claim 3, wherein said shaper comprises a tube with a puller at the end of said tube opposite said funnel outlet.

9. A machine according to claim 8, wherein said tube consists of separable halves and is flared at the inlet end thereof.

10. A machine according to claim 3, wherein a pair of opposite conveyor rollers are mounted within said bath.

11. A machine according to claim 3, wherein said funnel has perforations on the lower side thereof.

References Cited

UNITED STATES PATENTS

| | | | |
|---|---|---|---|
| 1,713,683 | 5/1929 | Wensel | 144—317 |
| 2,305,817 | 12/1942 | Sukohl | 161—143 |
| 3,120,690 | 2/1964 | Stevens | 156—166 |
| 3,189,506 | 6/1965 | Cobb et al. | 156—296 |
| 3,390,039 | 6/1968 | Coughman et al. | 156—296 |

GERALD A. DOST, Primary Examiner

U.S. Cl. X.R.

144—3; 156—296; 161—143